United States Patent
Beardsley et al.

(10) Patent No.: US 7,242,818 B2
(45) Date of Patent: Jul. 10, 2007

(54) POSITION AND ORIENTATION SENSING WITH A PROJECTOR

(75) Inventors: Paul A. Beardsley, Boston, MA (US); Ramesh Raskar, Cambridge, MA (US); Vaibhav Vaish, Mountain View, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 974 days.

(21) Appl. No.: 10/346,442

(22) Filed: Jan. 17, 2003

(65) Prior Publication Data

US 2004/0141156 A1 Jul. 22, 2004

(51) Int. Cl.
G06K 9/36 (2006.01)
(52) U.S. Cl. .................................. 382/291; 353/70
(58) Field of Classification Search ............ 382/103, 382/108, 289; 348/187, 333.1; 396/430, 396/431
See application file for complete search history.

(56) References Cited

U.S. PATENT DOCUMENTS 4,443,706 A * 4/1984 DiMatteo et al. ........... 250/558
4,724,480 A * 2/1988 Hecker et al. ................ 348/95
6,618,076 B1 * 9/2003 Sukthankar et al. ........ 348/180
6,816,187 B1 * 11/2004 Iwai et al. .................. 348/187

OTHER PUBLICATIONS

Zhang, "A Flexible New Technique for Camera Calibration", IEEE Transactions On Pattern Analysis and Machine Intelligence, vol. 22, No. 11, Nov. 2000.*
Dementhon et al, "Exact and Approximate Solutions of the Perspective-Three-Point Problem", IEEE Transactions On Pattern Analysis and Machine Intelligence, vol. 14, No. 11, Nov. 1992.*

* cited by examiner

Primary Examiner—Matthew C. Bella
Assistant Examiner—Tom Y. Lu
(74) Attorney, Agent, or Firm—Dirk Brinkman; Clifton D. Maeller; Gene V. Vinokur

(57) ABSTRACT

A position and orientation of a projector are determined from projected images. First, a homography between a camera and a planar surface, where the relationship between the camera and planar surface is fixed, is determined. Next, a known pattern is projected on the planar surface with a projector having known intrinsic parameters and an unknown position and orientation. An image of the known pattern is acquired with the camera, and a position and orientation of the projector is determined from the image using the homography and the intrinsic parameters.

28 Claims, 3 Drawing Sheets

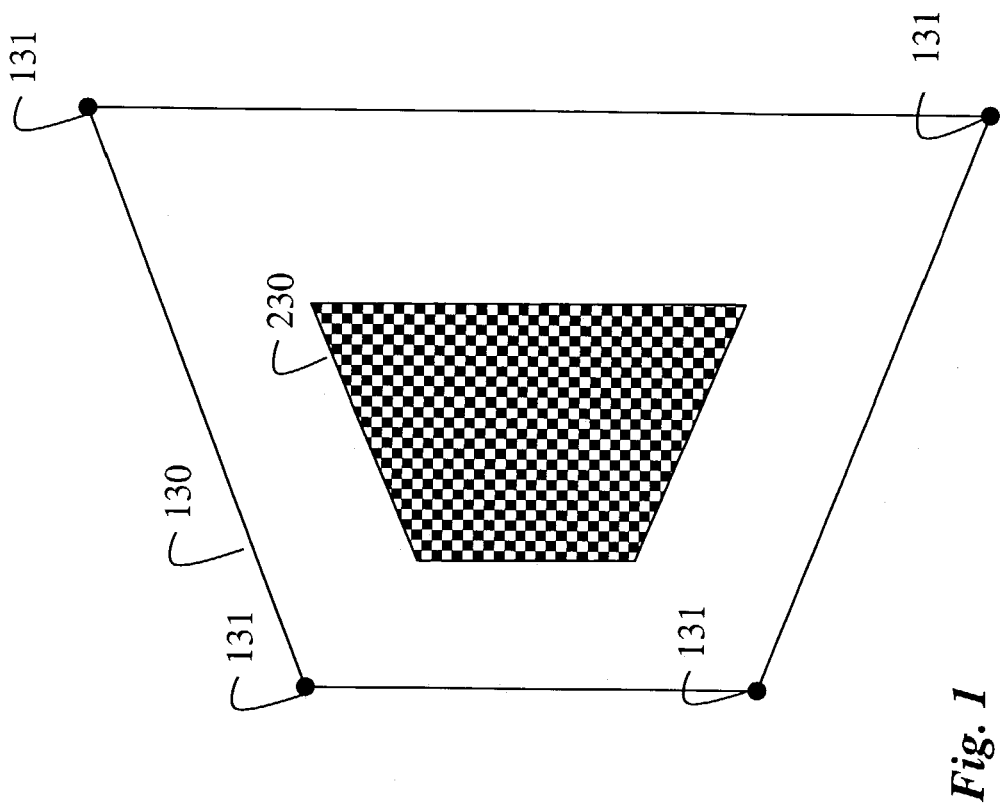
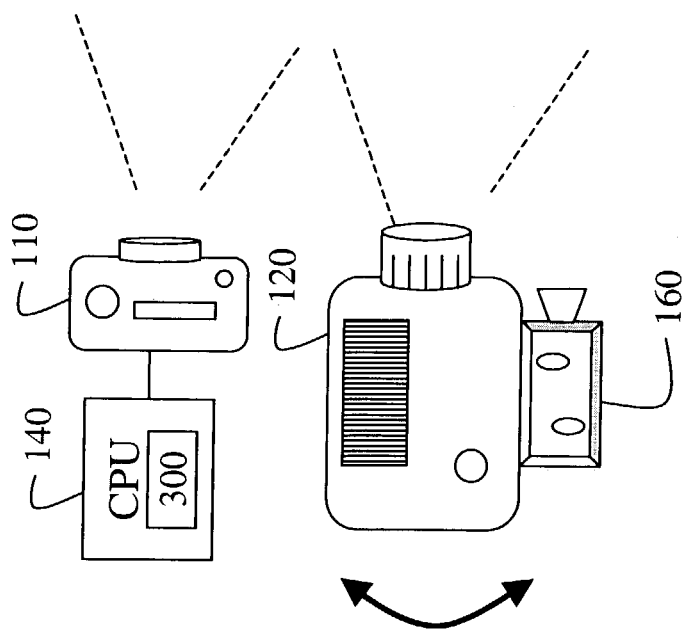
Fig. 1

POSITION AND ORIENTATION SENSING WITH A PROJECTOR

FIELD OF THE INVENTION

The invention relates generally to computer vision, and more particularly to determining the position and orientation of an object using a projected image.

BACKGROUND OF THE INVENTION

Position sensors are useful for many applications in which it is necessary to determine the position and orientation of an object. Hereinafter, the term 'position sensor' means both position and orientation sensor. The position is the location of the object in a three-dimensional coordinate frame, and the orientation of the object is its rotation relative to that coordinate frame.

In an example application, a position sensor can be attached to a moving camera that is being used for 3D scanning. The position and orientation of the camera are then known, to aid creation of a 3D reconstruction of a scene from the images acquired by the moving camera. Similarly, a position sensor can be attached to a projector to aid correct projection of an image onto a surface or an object. A position sensor can also be attached to a tool so that the tool can be properly positioned with respect to a part or a working surface. If a user is manipulating the tool, the position sensor enables haptic or other feedback, for example in teleoperation, or for computer-aided surgery. A position sensor can also be used to track the location of a moving object such as a vehicle or person.

One way that position sensors have been used in prior art applications is to place visual markers or active emitters, such as LEDs, in known positions in the environment. In those applications, the position sensor can be a camera that observes the markers or emitters in order to infer its own position and orientation. Other applications use ultrasound instead of light. Alternatively, visual markers or active emitters can be attached to the object of interest so that the object's position and orientation can be determined directly using a camera observing the object.

A system which uses LED emitters in the environment is described in "The HiBall Tracker: High-Performance Wide-Area Tracking for Virtual and Augmented Environments," by Welch et al, Proc. of the ACM Symposium on Virtual Reality Software and Technology, 1999. A system which uses ultrasound emitters in the environment is the IS-600 motion tracker by Intersense Corporation, Burlington, Mass.

Prior art approaches have limitations. Altering the environment can be difficult when the environment is large or includes hard-to-reach places. And the instrumentation of the environment must be followed by a calibration procedure. Thus these types of systems tend to be fixed installations with a fixed workspace, and are not easily or quickly deployable in a new setting. Systems that involve attaching markers or emitters, such as LEDs, to an object usually require multiple emitters that span the surface of the object. A calibration procedure is used to determine the placement of the markers or emitters. It is problematic to attach multiple markers or emitters to a small object. It is also problematic if the object is handheld, since the user has to adopt a grip that does not occlude the markers or emitters.

These problems could be overcome with electromagnetic sensors, but such systems are considerably more complex and costly, and calibration still remains as a problem. Most of the prior art techniques require a relatively static set-up, which makes it difficult to use such systems in ad-hoc, dynamically changing environments. An example of an electromagnetic system is the Fastrak® motion tracking product by Polhemus Inc., of Colchester, Vt.

Thus, there is a need for a position and orientation sensor for an object, which works without having to modify the environment, and which does not require a complicated calibration. There is also a need for a position and orientation sensor that is compact, i.e., the sensor does not require markers or emitters that are distributed across the environment, or across the surface of an object of interest. An advantage of compactness for a position sensor attached to a hand-held object is that the user can easily adopt a grip on some part of the object without occluding the position sensor.

SUMMARY OF THE INVENTION

A position and orientation of a projector are determined from projected images. First, a homography between a camera and a planar surface, with the camera and planar surface in a fixed relationship, is determined.

Next, a known pattern is projected on the planar surface using a projector having known intrinsic parameters and an unknown position and orientation.

An image of the known pattern is acquired with the camera, and a position and orientation of the projector is determined from the image, using the homography and the intrinsic parameters.

BRIEF DESCRIPTION OF THE DRAWINGS

FIG. 1 is a block diagram of a position and orientation sensing system according to the invention;

DETAILED DESCRIPTION OF THE PREFERRED EMBODIMENT

System Structure

Figure 2:
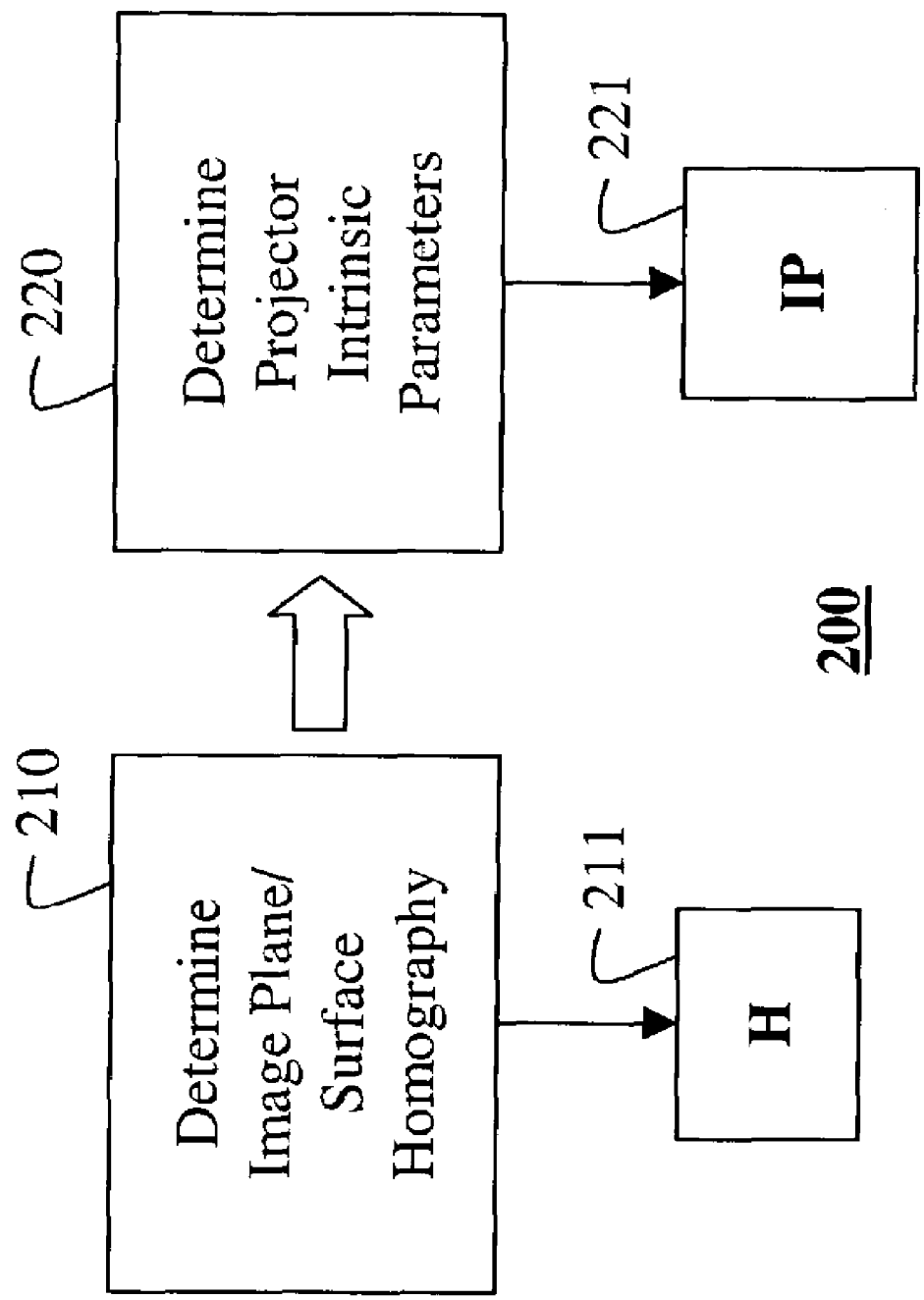
FIG. 2 is a flow diagram of a calibration process according to the invention.

FIG. 1 shows a position and orientation sensing system 100 according to the invention. The system includes a fixed camera 110 and a movable projector 120. Both the camera 110 and the projector 120 view a fixed, planar (2D) surface 130. The camera and the planar surface have a fixed relative position with respect to each other. The camera and projector can be on the same side of the surface, or alternatively, if the surface is translucent, the camera and the projector can be on opposite sides of the planar surface.

In a preferred embodiment, the camera 110 and the projector 120 are digital devices. Analog devices, with A/D converters, are also possible.

A processor (CPU) 140 is coupled to the camera 110. The processor 140 is equipped with a memory and I/O ports as are known in the art. The processor 140 is capable of executing a position and orientation sensing method 300 according to the invention, as described below in greater detail.

System Operation

Calibration

As shown in FIG. 2, a calibration procedure 200 of the system 100 has two stages 210-220. The second is optional. In the first stage 210, the fixed camera 110 is calibrated relative to the fixed planar surface 130 to determine a homography H 211 between a coordinate frame of an image plane of the camera 110, and a Euclidean (metric) coordinate frame of the fixed surface 130. This can be achieved, using well known geometric relationships, given four points 131 of known position on the fixed surface 130, e.g., the four corners of a square on the fixed planar surface 130.

The homography 211 relates the coordinate frame of the camera 110 to the coordinate frame of the fixed surface 130 in the following way.

For an image point x of a corresponding point X on the 2D surface, the relationship is $$x = HX,$$

where x and X are in homogeneous coordinates, and H is a 3×3 matrix describing the nomography. Given four sets of corresponding points $\{x_i, X_i\}$ for $i=1, \ldots, 4$, the above equation generates a linear system in the array elements of the homography H 211 so it is possible to solve for H.

If an overall scale of the coordinate frame of the surface 130 is unknown, e.g., the four points 131 on the surface 130 are known to be the corners of a square but the size of the square is unknown, then the position and orientation of the projector 120 is determined up to an unknown scale in the subsequent processing. This is sufficient for many applications e.g. for 3D scanning of a scene in which the goal is to create a 3D reconstruction but the overall scale may be immaterial.

In the second optional stage 220, the calibration procedure 200 determines the intrinsic parameters IP 221 of the projector 120. Determining the intrinsic parameters of a pinhole device, such as the projector 120, is a well-known process. Alternatively, the intrinsic parameters of the projector 120 can be determined while the system 100 is operating, as described in further detail below.

Position and Orientation Sensing

Figure 3:
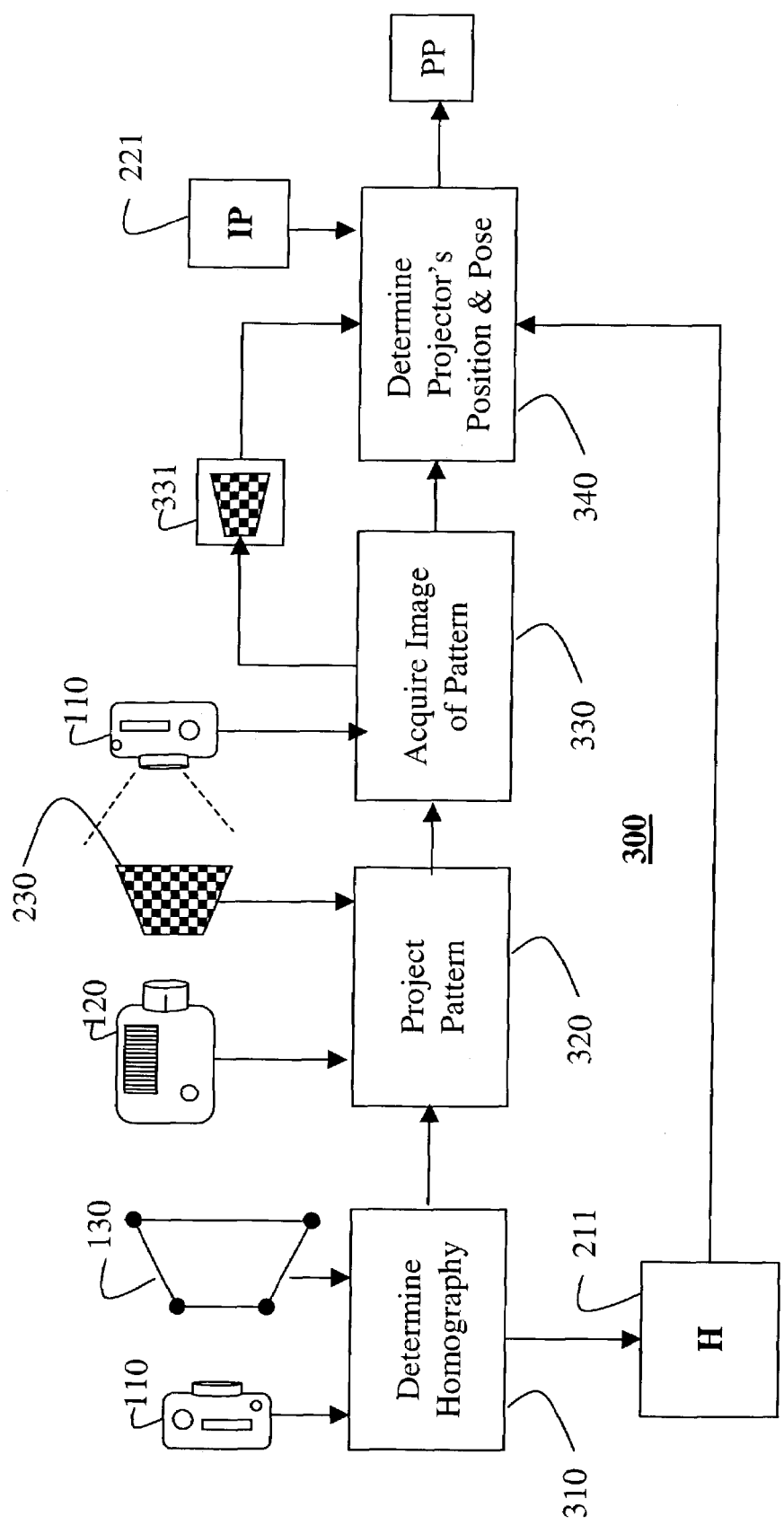
FIG. 3 is a flow diagram of a position and orientation sensing method according to the invention.

As shown in FIG. 3, the position sensing system 100 can be used for sensing the position and orientation of an object using the projector 120 and the method 300.

First, the homography 211 between the camera 110 and the planar surface 130 is determined 310, as described above.

Next, a known pattern 230 is projected 320 onto the planar surface 210 by the projector 120 having known intrinsic parameters 221, but an unknown position and orientation. Minimally, the pattern 230 includes at least three distinct non-collinear points.

Then, the camera 110 acquires 330 an image 331 of the known pattern 230, and the features of the pattern 230 are measured in image coordinates of the projector 120.

In the last step 340 of the process 300, the homography 211 is used to transform features of the pattern from the coordinate frame of the image 331 to the coordinate frame of the planar surface 130.

Given the coordinates of the features of the pattern 230 on the planar surface 130, and the corresponding coordinates of the pattern features on the projector's image plane, and the projector's intrinsic parameters 221, the position and orientation of the projector 120 are determined. The approach is an adaptation of a method described by DeMenthon U.S. Pat. No. 5,388,059, incorporated by reference.

The DeMenthon method is for computing the position and orientation of a camera with known intrinsic parameters observing a physical pattern with known coordinates. Here, that method is adapted for the case of a projector which is projecting a pattern onto a plane, with a coordinate frame imposed on the projected pattern by means of a fixed camera observing the plane.

There are multiple solutions for the position and orientation when only three points are used, but there are known ways to deal with this to obtain a unique solution. For example, by integrating the information as the device moves over time, or by using four or more points instead of three. The latter approach is straightforward for the system 100 because there is complete control of the pattern that is projected. As a further advantage of the system 100, the projected pattern can be adapted as necessary during operation, to provide the best possible view to the fixed camera(s).

Any system that can be modeled as a pinhole projector is suitable for making the projection, e.g., three different-colored laser pointers with distinct beam directions and with the beams concurrent at a point, or with the beams non-concurrent but with calibration data to take account of the non-concurrency.

In an alternative embodiment, the intrinsic parameters 221 of the projector 210 can be determined during operation of the system 100. In this case, the pattern 230 is projected for two different positions of the projector 220. The minimum requirements on the pattern in this case are that there are four distinct points in general positions, or any equivalent pattern.

Projector Intrinsic Parameters

The projector's intrinsic parameters can be determined as follows. First, the homography H 211 is used to determine coordinates of the projected pattern features on the planar surface 130. Then, a first homography G1 is determined between the image plane of the projector 120, and the planar surface for a first position P1 of the projector. Similarly a second homography G2 is computed for a second position P2 of the projector. Given G1 and G2, it is possible to determine the intrinsic parameters 221 of the projector 120 as described by Zhang in U.S. Pat. No. 6,437,823, incorporated by reference.

That technique was developed for intrinsic parameters of a camera. However, we apply that technique to determine the intrinsic parameters of a projector.

The operation 200 of the system 100 described above uses one fixed camera 110. If the projector 120 is moving across an extended area, so that the projected pattern is likely to move out of the field of view of any one camera, then multiple fixed cameras can be used, each observing a different part of the fixed planar surface 130. In this case, the calibration of the fixed cameras requires the determination of multiple homographies H1, H2, etc., between the image plane of each camera, and a common coordinate frame of the fixed surface 130.

There can also be multiple fixed surfaces, each surface observed by one or more fixed cameras. In this case, the projector 120 can be moving inside a room, and the ceiling, floor, or walls provide the fixed planar surfaces.

If a wide-angle or omni-directional projector is projecting simultaneously on multiple surfaces for a wide field of view, all of the projection information can be used simultaneously for determining the position and orientation of the projector 120 to a greater accuracy.

In a practical application, the projector 120 can be in a fixed relationship to an object 160 of interest. Then, the position and orientation of the projector can be used to infer a position and orientation of the object 160. If the object has its own coordinate frame, then the projector and object can be calibrated in another calibration step.

For example, the object 160 can be a second moving camera. Now, the projector 120 can track the position and orientation of the camera 160. This is useful when the second camera 160 is used for 3D scanning. In this application, the inferred positions and orientations of second camera can be used to determine a 3D reconstruction from the scanned images.

Alternatively, the object can be another projector. In this application, the second projector projects images into the environment according to the inferred position and orientation of the second projector. This is useful for augmenting virtual reality scenes, or active display areas.

The object can also be a tool so that feedback dependent on the inferred position and orientation of the tool can be provided to a user. For example, the feedback can be haptic.

In another application, the projector can be attached to an object, which is moving in 2D, e.g., a car or robot, in which case only the position is relevant, and the orientation is irrelevant.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a position and orientation of a projector, comprising:
   determining a homography between a camera and a planar surface, with the camera and planar surface in fixed relative position to each other;
   projecting a pattern on the planar surface with a projector having known intrinsic parameters and an unknown position and orientation;
   acquiring an image of the pattern with the camera; and
   determining a position and orientation of the projector from the image using the homography and the intrinsic parameters.

2. The method of claim 1 wherein the projector is a pinhole device, and further comprising:
   projecting at least three non-collinear distinct points on the planar surface to form the pattern.

3. The method of claim 2 further comprising:
   calibrating the projector during a preprocessing step to determine the intrinsic parameters.

4. The method of claim 1 wherein the pattern includes at least four distinct points in general position, and further comprising:
   making at least two projections of the known pattern for distinct orientations of the projector, and using the acquired images of the at least two projections to calibrate the intrinsic parameters of the projector, while determining the position and orientation of the projector.

5. The method of claim 1 wherein the projector is omni-directional, and further comprising:
   projecting an omni-directional pattern.

6. The method of claim 1 wherein the projector is wide-angle, and further comprising:
   projecting the pattern across a wide field of view.

7. The method of claim 1 wherein the projector uses visible light.

8. The method of claim 1 wherein the projector uses infra-red radiation.

9. The method of claim 1 wherein multiple fixed cameras are used to acquire multiple images of the projected known pattern.

10. The method of claim 9 wherein multiple planar surfaces are used, there being one camera for each planar surface.

11. The method of claim 9 wherein multiple planar surfaces are used, there being one or more cameras for each planar surface.

12. The method of claim 1 wherein the planar surface is a ceiling of a room, and further comprising:
    moving the projector in the room while determining multiple positions and orientations of the projector.

13. The method of claim 1 wherein the camera and the projector are on a same side of the planar surface.

14. The method of claim 1 wherein the planar surface is a translucent screen, and the projector and fixed camera are on opposite sides of the translucent screen.

15. The method of claim 10 further comprising:
    projecting multiple known patterns simultaneously on the multiple planar surfaces; and
    determining the position and orientation of the projector by simultaneously using all the multiple projected known patterns.

16. The method of claim 1 further comprising:
    attaching the projector to an object and using the projector to infer a position and orientation of the object.

17. The method of claim 16 in which the position and orientation of the projector are in a known physical relationship with the position and orientation of the object.

18. The method of claim 16 in which the physical relationship of the position and orientation of the projector and the object is calibrated in a calibration step.

19. The method of claim 16 wherein the object is a second camera, and further comprising:
    acquiring scanned images with the second camera; and
    determining a 3D reconstruction of the scene from the scanned images, making use of the inferred position and orientation of the second camera.

20. The method of claim 16 wherein the object is a second projector, and further comprising:
    projecting images with the second projector according to the inferred position and orientation of the second projector.

21. The method of claim 16 wherein the object is a tool, and further comprising:
    providing feedback dependent on the inferred position and orientation of the tool.

22. The method of claim 16 wherein the object is a vehicle.

23. The method of claim 16 wherein the object is a person.

24. The method of claim 4 further comprising:
    determine coordinates of features of the known pattern on the planar surface, by means of the fixed camera and the homography between the camera and the planar surface;
    determine a first homography G1 between an image plane of the projector and the planar surface for a first position P1 of the projector;
    determine a second homography G1 between the image plane of the projector and the planar surface for a second position P1 of the projector; and
    determine the intrinsic parameters of the projector using the first and second homographies G1 and G2.

25. A system for determining a position and orientation of a projector, comprising:
   a camera having a fixed relationship to a planar surface;
   means for determining a homography between the camera and the planar surface;
   a projector configured to project a pattern on the planar surface, the projector having known intrinsic parameters and an unknown position and orientation; and
   means for determining a position and orientation of the projector from the image using the homography and the intrinsic parameters, and an image of the known pattern acquired by the camera.

26. The system of claim 25, further comprising:
   an object attached to the projector wherein the position and orientation of the projector is used to infer a position and orientation of the object.

27. The system of claim 26 wherein the position and orientation of the projector are in a known physical relationship with the position and orientation of the object.

28. The system of claim 26 wherein the physical relationship of the position and orientation of the projector and the object is calibrated in a calibration step.

* * * * *